(12) United States Patent
Mita

(10) Patent No.: US 12,046,885 B2
(45) Date of Patent: Jul. 23, 2024

(54) ELECTRICAL JUNCTION BOX

(71) Applicant: Yazaki Corporation, Tokyo (JP)

(72) Inventor: Akihiro Mita, Hiroshima (JP)

(73) Assignee: YAZAKI CORPORATION, Tokyo (JP)

( * ) Notice: Subject to any disclaimer, the term of this patent is extended or adjusted under 35 U.S.C. 154(b) by 240 days.

(21) Appl. No.: 17/747,051

(22) Filed: May 18, 2022

(65) Prior Publication Data
US 2022/0407297 A1 Dec. 22, 2022

(30) Foreign Application Priority Data

Jun. 18, 2021 (JP) .................................. 2021-101515

(51) Int. Cl.
H02G 3/08 (2006.01)
H02G 3/14 (2006.01)

(52) U.S. Cl.
CPC .............. *H02G 3/081* (2013.01); *H02G 3/14* (2013.01)

(58) Field of Classification Search
CPC ............ H02G 3/08; H02G 3/081; H02G 3/14; H02G 3/086; H05K 5/00; H05K 5/02; H05K 5/03; H05K 5/0004; B60R 16/00; B60R 16/02; F16B 21/07
USPC .................... 174/50, 520, 535, 17 R, 66, 67; 220/3.2–3.9; 439/76.1, 76.2, 949; 361/600, 622, 641, 837, 605
See application file for complete search history.

(56) References Cited

U.S. PATENT DOCUMENTS

| | | | | |
|---|---|---|---|---|
| 6,462,270 B1 * | 10/2002 | Depp | ..................... | H02G 3/081 174/59 |
| 7,172,440 B2 * | 2/2007 | Kanamaru | ........... | H01R 13/447 439/949 |
| 7,507,094 B2 * | 3/2009 | Kubota | ................ | H01R 13/631 439/76.2 |
| 8,163,994 B2 * | 4/2012 | Taniguchi | .............. | H02G 3/081 174/559 |
| 8,210,378 B2 * | 7/2012 | Takeuchi | ................. | H02G 3/14 220/3.8 |
| 8,969,723 B2 * | 3/2015 | Hirasawa | ................ | H02G 3/088 439/76.1 |
| 9,985,400 B2 * | 5/2018 | Kawaguchi | .............. | H02G 3/08 |
| 11,394,186 B2 * | 7/2022 | Sugiyama | .............. | H02G 3/081 |
| 11,600,977 B2 * | 3/2023 | Kakimi | ................. | H02G 3/081 |

(Continued)

FOREIGN PATENT DOCUMENTS

JP 2021-044944 A 3/2021

Primary Examiner — Angel R Estrada
(74) Attorney, Agent, or Firm — Sughrue Mion, PLLC

(57) ABSTRACT

An electrical junction box includes a case body on which a first opening and a second opening are formed, a first cover configured to be fixed to the case body such that the first cover covers the first opening, and a second cover configured to be fixed to the case body such that the second cover covers the second opening. The second cover is fixed to the case body by a first rotation fulcrum engaging part and an inter-cover engaging part. The first rotation fulcrum engaging part includes an engaging protrusion formed on one end of the case body, and an engaging frame formed on one end of the second cover and configured to be engaged with the engaging protrusion. The inter-cover engaging part includes a lock arm formed on another end of the second cover, and a lock arm receiving part formed on the first cover.

3 Claims, 9 Drawing Sheets

(56) References Cited

U.S. PATENT DOCUMENTS

| | | | | |
|---|---|---|---|---|
| 11,713,009 B2* | 8/2023 | Kurata | ................ | B60R 16/0238 |
| | | | | 439/76.2 |
| 11,855,429 B2* | 12/2023 | Magda | ................ | B60R 16/0238 |

* cited by examiner

Related Art

US 12,046,885 B2

ELECTRICAL JUNCTION BOX

TECHNICAL FIELD

The present invention relates to an electrical junction box configured to be mounted on a motor vehicle.

BACKGROUND

An electrical junction box 501 shown in FIG. 9 is one example of a conventional electrical junction box configured to be mounted on a motor vehicle. The electrical junction box 501 includes a case body 521 including an upper surface on which a first opening 531 and a second opening 532 are formed, a first cover 527 that covers the first opening 531, and a second cover 525 that covers the second opening 532. The first cover 527 and the second cover 525 are respectively fixed to the case body 521 by a plurality of engaging parts (such as a lock arm formed on the cover 527, 525 side or a lock arm receiving part formed on the case body 521 side) (see Patent Document 1).

PRIOR ART DOCUMENT

Patent Document 1: JP 2021-044944 A

SUMMARY OF THE INVENTION

Problem to be Solved by the Invention

The conventional electrical junction box 501 described above has a drawback that, since each cover 527, 525 is fixed to the case body 521 by the plurality of engaging parts, it is necessary to disengage the plurality of engaging parts when removing these covers 527, 525 from the case body 521 during maintenance work and such, making the work complicated.

In view of the above-described drawback, an object of the present invention is to provide an electrical junction box in which the cover can be removed easily from the case body.

Solution to the Problem

In order to achieve the above-described object, the present invention provides, in one aspect, an electrical junction box including a case body on which a first opening and a second opening are formed, a first cover configured to be fixed to the case body such that the first cover covers the first opening, and a second cover configured to be fixed to the case body such that the second cover covers the second opening, wherein the second cover is fixed to the case body by a first rotation fulcrum engaging part and an inter-cover engaging part, the first rotation fulcrum engaging part includes an engaging protrusion formed on one end of the case body, and an engaging frame formed on one end of the second cover and configured to be engaged with the engaging protrusion, and the inter-cover engaging part includes a lock arm formed on another end of the second cover, and a lock arm receiving part formed on the first cover.

Advantageous Effect of the Invention

According to the present invention, the second cover can be easily removed from the case body.

DETAILED DESCRIPTION OF THE EXEMPLARY EMBODIMENTS

In the following, an electrical junction box according to a first embodiment of the present invention will be described with reference to FIG. 1 to FIG. 4.

Figure 1:
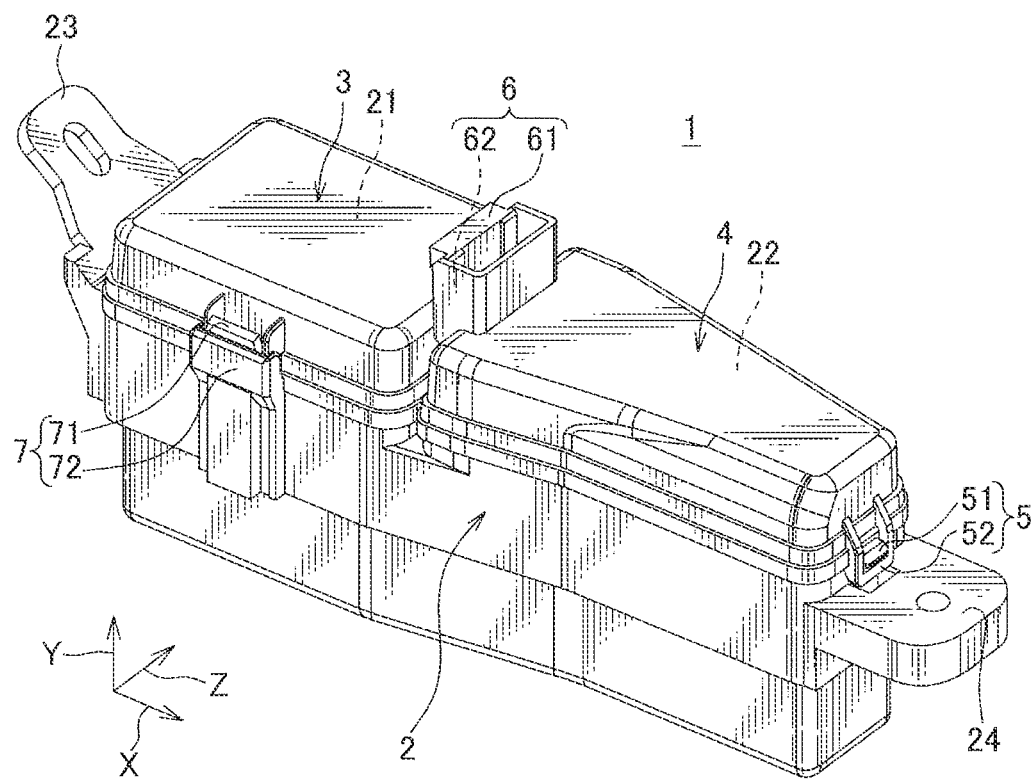
FIG. 1 is a perspective view of an electrical junction box according to a first embodiment of the present invention.

The electrical junction box 1 shown in FIG. 1 is configured to be mounted on a motor vehicle and includes a case body 2, a plurality of components (e.g., relays, fuses) housed the case body 2, a first cover 3, and a second cover 4.

Figure 2:
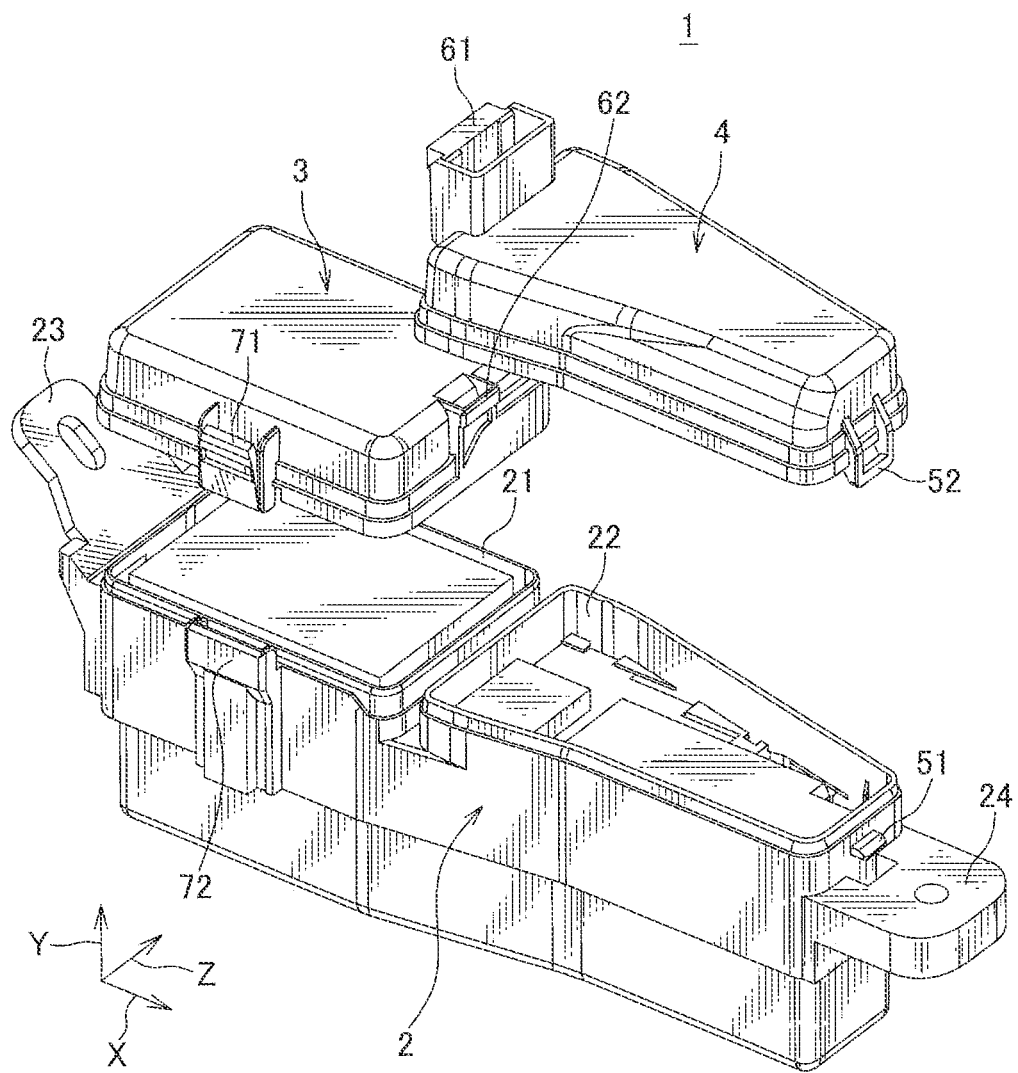
FIG. 2 is an exploded view of the electrical junction box of FIG. 1.

The case body 2 is made of synthetic resin. The case body 2 is formed in an elongated shape with a longitudinal direction, a width direction and a height direction corresponding to an X direction, a Y direction and Z direction in FIG. 2, respectively. As shown in FIG. 2, the case body 2 includes an upper surface on which a first opening 21 and a second opening 22 are formed. The first opening 21 and the second opening 22 are aligned in the longitudinal direction of the case body 2. A fixing part 24 for fixation with respect to a vehicle body is provided at one end in the longitudinal direction of the case body 2. A fixing part 23 for fixation with respect to the vehicle body is provided at another end in the longitudinal direction of the case body 2.

In the electrical junction box 1 of this example, the case body 2 is divided into a dealer maintenance area and a user maintenance area in order to improve the maintainability by a user. An area corresponding to the first opening 21 is the dealer maintenance area, and an area corresponding to the second opening 22 is the user maintenance area.

The first cover 3 and the second cover 4 are made of synthetic resin. The first cover 3 is fixed to the case body 2 such that the first cover 3 covers the first opening 21. Further, the first cover 3 is fixed to the case body 2 by only an engaging part 7 and an inter-cover engaging part 6. The second cover 4 is fixed to the case body 2 such that the second cover 4 covers the second opening 22. Further, the second cover 4 is fixed to the case body 2 by only a rotation fulcrum engaging part 5 and the inter-cover engaging part 6.

The engaging part 7 includes a lock arm 71 formed on the first cover 3, and a lock arm receiving part 72 formed on the case body 2. To be more specific, the lock arm 71 is formed on one side surface of the first cover 3 which extends in the longitudinal direction of the case body 2. The lock arm receiving part 72 is formed on one side surface of the case body 2 which extends in the longitudinal direction.

The inter-cover engaging part 6 includes a lock arm 61 formed on the second cover 4, and a lock arm receiving part 62 formed on the first cover 3. To be more specific, the lock arm 61 is formed on one side surface of the second cover 4 which is adjacent to the first cover 3 and which extends in the width direction of the case body 2. The lock arm receiving part 62 is formed on one side surface of the first cover 3 which is adjacent to the second cover 4 and which extends in the width direction of the case body 2.

The rotation fulcrum engaging part 5 includes an engaging protrusion 51 formed on the case body 2, and an engaging frame 52 formed on the second cover 4 and configured to be engaged with the engaging protrusion 51. To be more specific, the engaging protrusion 51 is formed on one side surface located at one end in the longitudinal direction of the case body 2 and is formed above the fixing part 24. The engaging frame 52 is formed on one side surface of the second cover 4 which is on the side opposite to the first cover 3 and which extends in the width direction of the case body 2.

Figure 3:
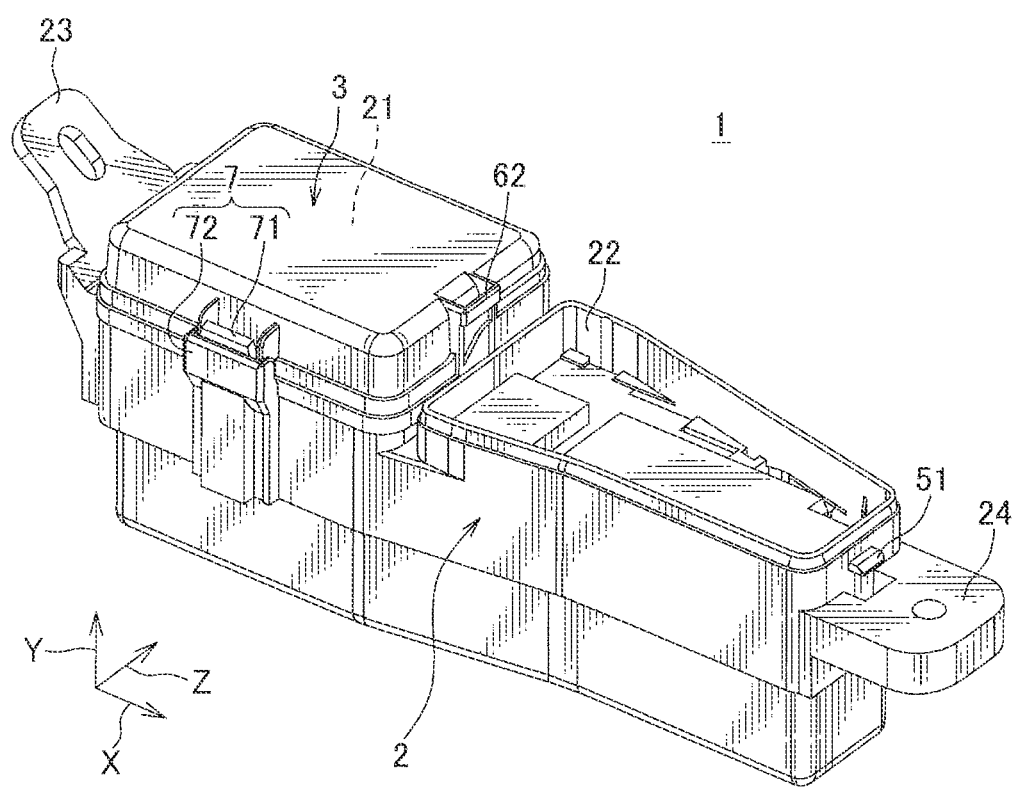
FIG. 3 illustrates a state in which a first opening shown in FIG. 2 is covered with a first cover.
Figure 4:
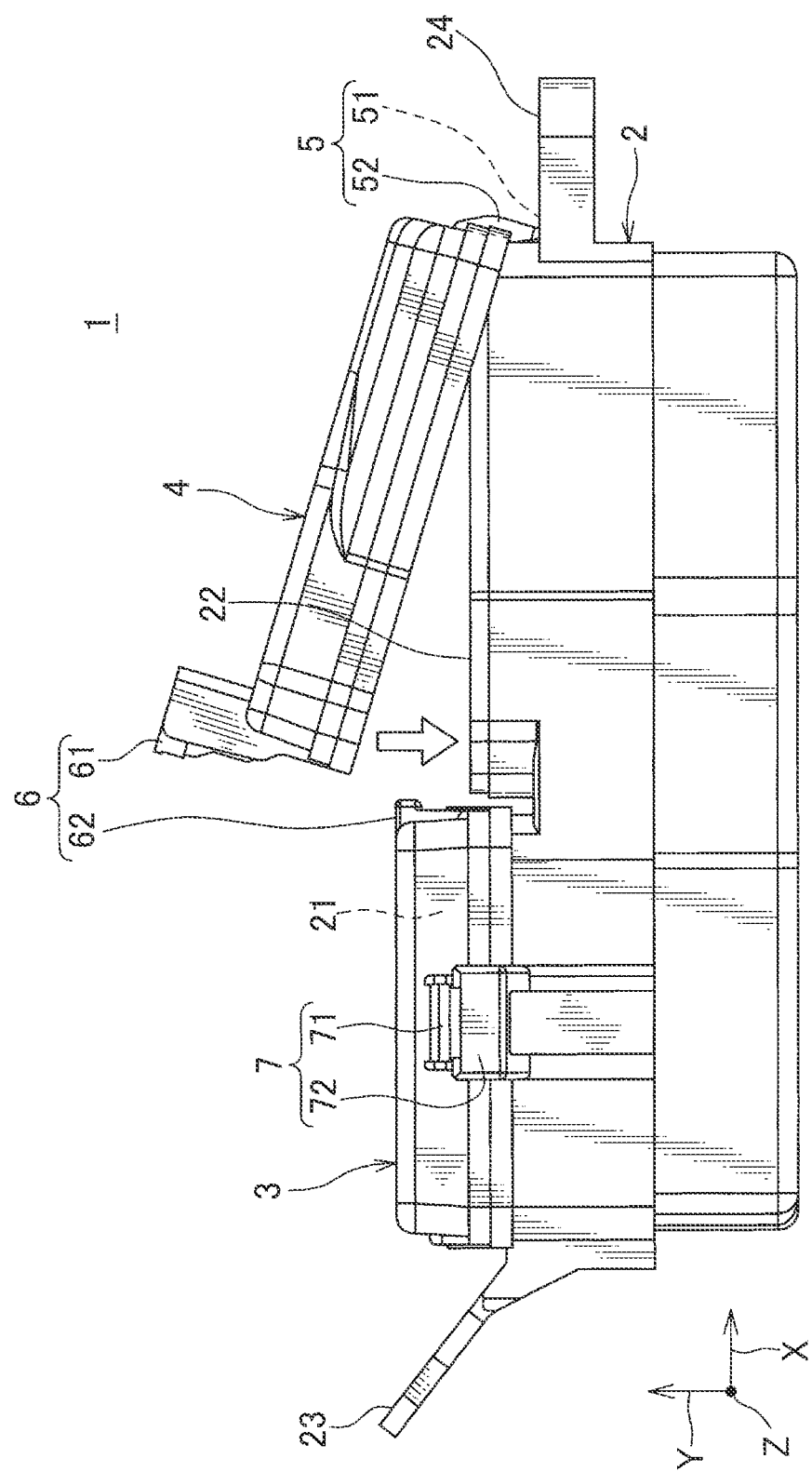
FIG. 4 illustrates a state in which a second opening shown in FIG. 3 is being covered with a second cover.

The first cover 3 and the second cover 4 are fixed to the case body 2 as follows. As shown in FIG. 3, firstly the first opening 21 is covered by the first cover 3, and the first cover 3 is pushed in the direction opposite to the Y direction to make the lock arm 71 engaged with the lock arm receiving part 72. Next, as shown in FIG. 4, the engaging frame 52 is engaged with the engaging protrusion 51, and the second cover 4 is rotated in the arrow direction about the engaging frame 52 to cover the second opening 22 by the second cover 4 and to make the lock arm 61 engaged with the lock arm receiving part 62. In this manner, the first cover 3 and the second cover 4 are fixed to the case body 2.

The first cover 3 and the second cover 4 are removed from the case body 2 as follows. First, the lock arm 61 is elastically deformed in a disengaging direction for example by pressing the lock arm 61 to disengage the lock arm 61 from the lock arm receiving part 62. While keeping this state, a part of the second cover 4 on the lock arm 61 side is lifted to displace the engaging frame 52 from the engaging protrusion 51 to remove the second cover 4 from the case body 2. Next, the lock arm 71 is elastically deformed in a disengaging direction for example by pressing the lock arm 71 to disengage the lock arm 71 from the lock arm receiving part 72. While keeping this state, the first cover 3 is lifted to remove the first cover 3 from the case body 2.

Thus, in the electrical junction box 1, the first cover 3 is fixed to the case body 2 by only the engaging part 7 and the inter-cover engaging part 6, and the second cover 4 is fixed to the case body 2 by only the rotation fulcrum engaging part 5 and the inter-cover engaging part 6. With this configuration, the first cover 3 and the second cover 4 can be easily fixed to and removed from the case body 2.

In the following, an electrical junction box according to a second embodiment of the present invention will be described with reference to FIG. 5 to FIG. 8. In FIG. 5 to FIG. 8, the same components as in the first embodiment described above are denoted by the same reference signs, and description thereof is omitted.

Figure 5:
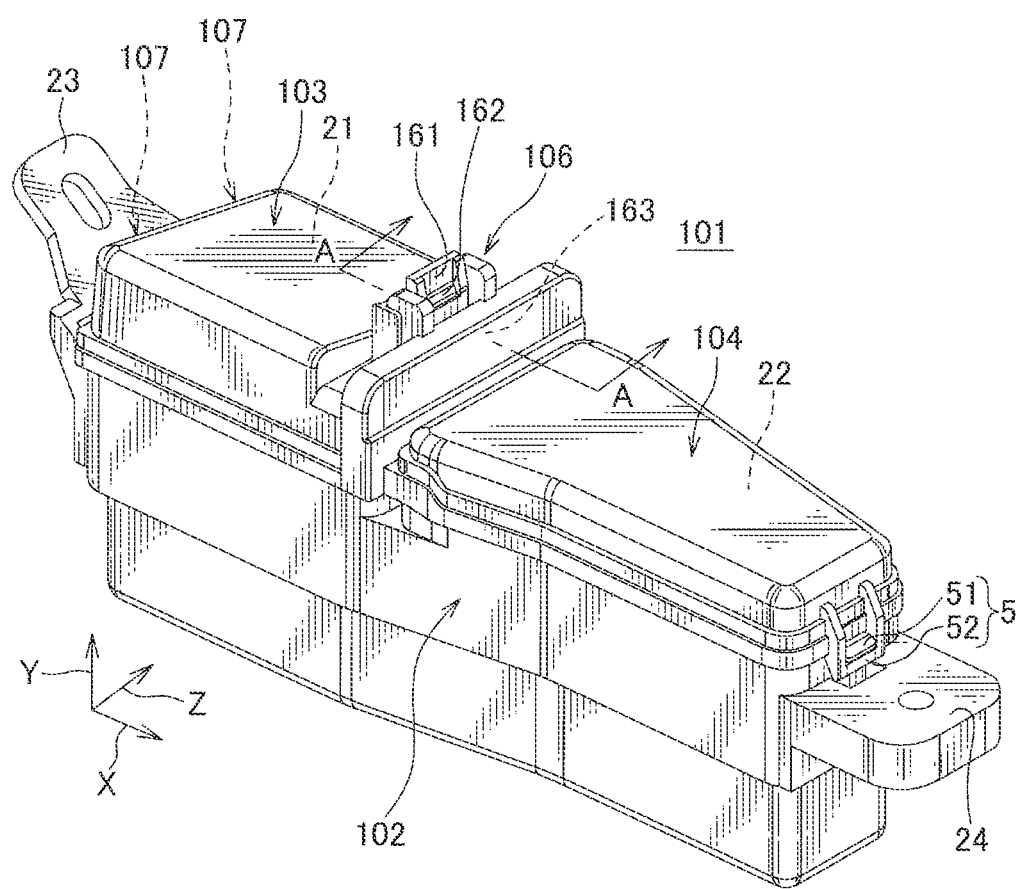
FIG. 5 is a perspective view of an electrical junction box according to a second embodiment of the present invention.
Figure 6:
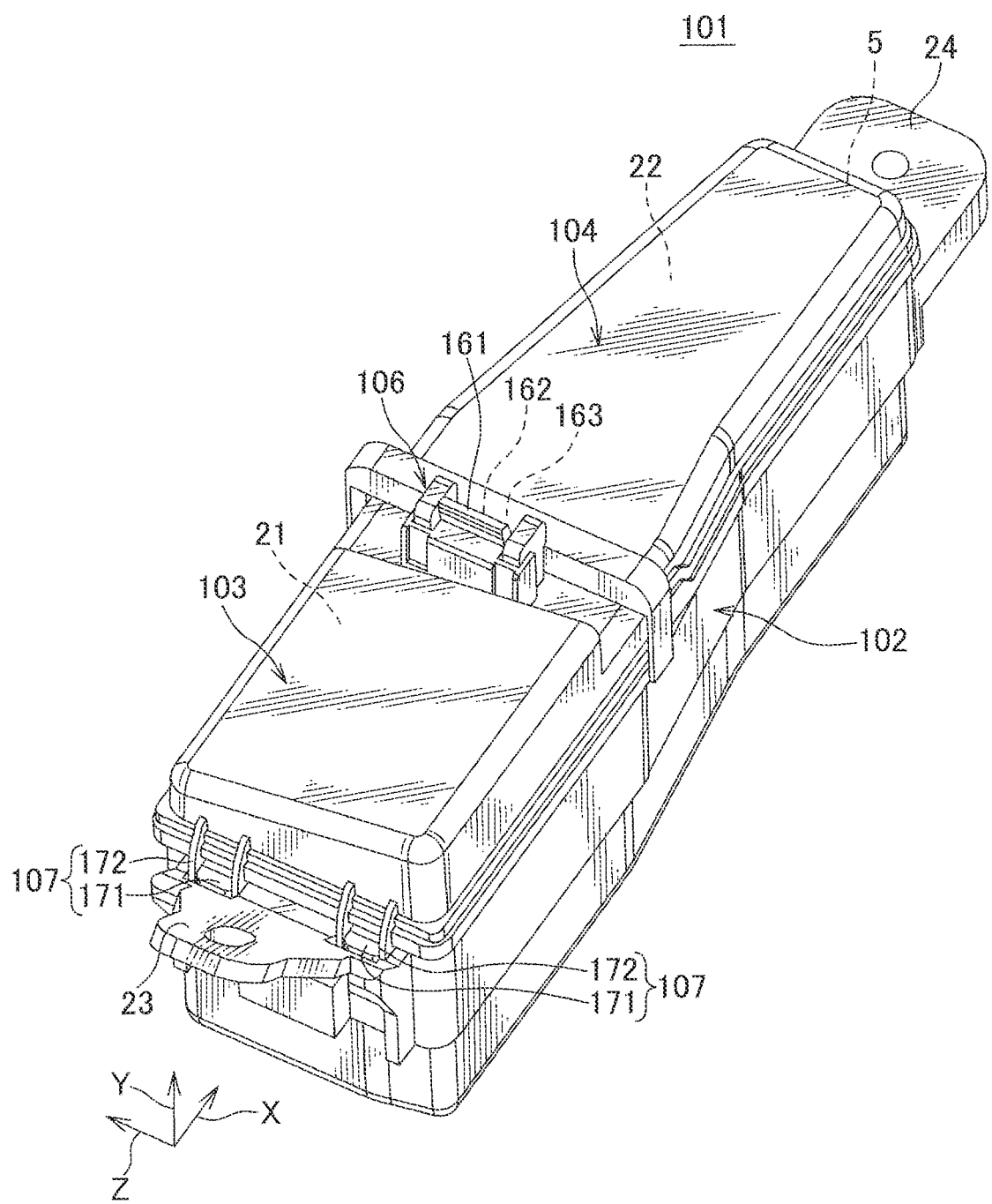
FIG. 6 is a perspective view of the electrical junction box of FIG. 5 as viewed from another angle.

An electrical junction box 101 shown in FIG. 5 and FIG. 6 is configured to be mounted on a motor vehicle and includes a case body 102, a plurality of components (e.g., relays and fuses) housed in the case body 102, a first cover 103, and a second cover 104.

The case body 102 has the same configuration as the case body 2 of the first embodiment, except that it does not include the lock arm receiving part 72 described in the first embodiment, instead it includes two engaging protrusions 171. The two engaging protrusions 171 are formed on one side surface located at another end in the longitudinal direction of the case body 102 and are formed above the fixing part 23.

Like the first embodiment, the first cover 103 is fixed to the case body 102 such that the first cover 103 covers the first opening 21. However, unlike the first embodiment, the first cover 103 of this embodiment is fixed to the case body 102 by only a rotation fulcrum engaging part 107 and an inter-cover engaging part 106.

Like the first embodiment, the second cover 104 is fixed to the case body 102 such that the second cover 4 covers the second opening 22. Further, the second cover 4 of this embodiment is fixed to the case body 102 by only a rotation fulcrum engaging part 5 and the inter-cover engaging part 106. The rotation fulcrum engaging part 5 has the same configuration as the first embodiment, thus the description thereof is omitted.

The rotation fulcrum engaging part 107 includes an engaging protrusion 171 formed on the case body 102, and an engaging frame 172 formed on the first cover 103 and configured to be engaged with the engaging protrusion 171. The engaging frame 172 is formed on one side surface of the first cover 103 which is on the side opposite to the second cover 104 and which extends in the width direction of the case body 102. In this embodiment, two rotation fulcrum engaging parts 107 (i.e., two sets of the engaging protrusion 171 and the engaging frame 172) are disposed in the width direction of the case body 102 with a space between each other.

The inter-cover engaging part 106 includes a lock arm 161 formed on the second cover 104, and a lock arm receiving part 162 and a recess 163 which are formed on the first cover 103.

Figure 7:
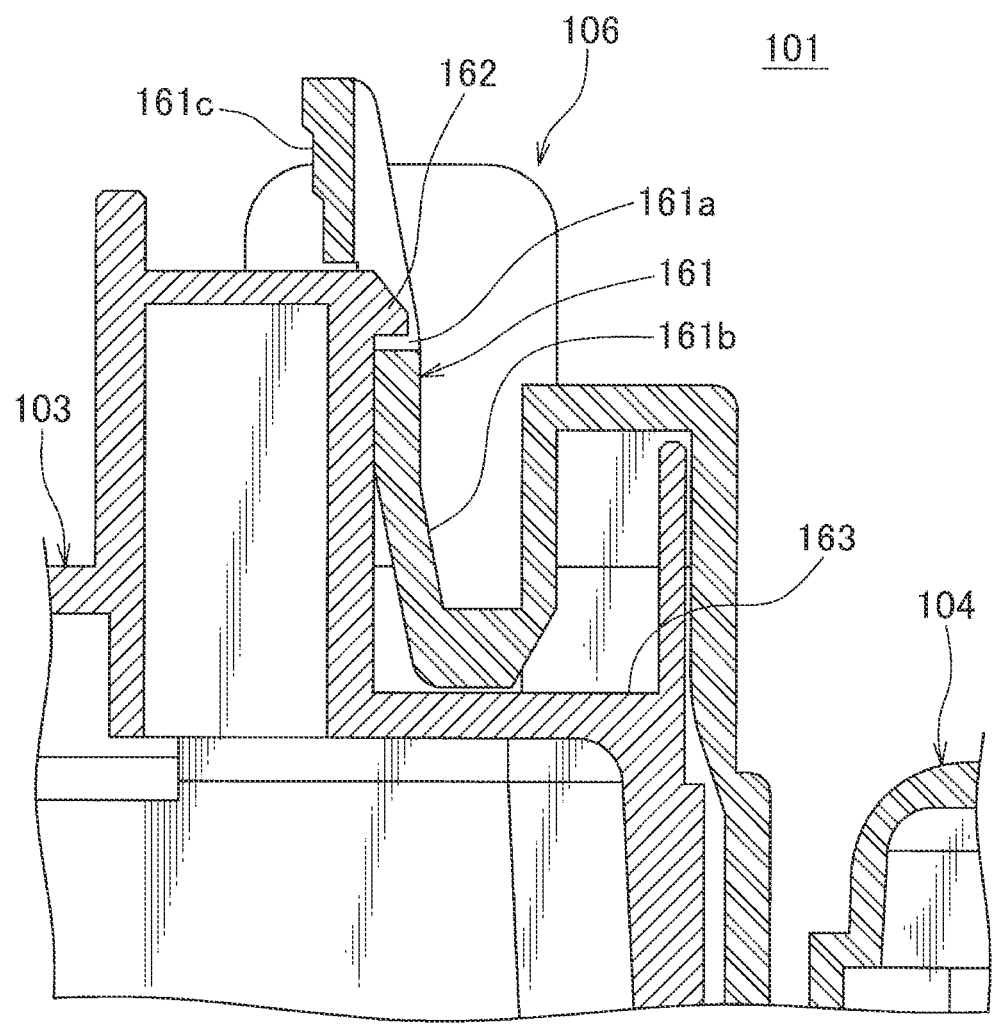
FIG. 7 is a cross-sectional view taken along a line A-A in FIG. 5.

As shown in FIG. 7, the lock arm 161 includes an arm part 161*b* which is elastically deformable, a hole 161*a* which is formed on the arm part 161*b* and into which the lock arm receiving part 162 having a protrusion shape is fitted, and an operation part 161*c* configured to be pushed for the disengagement.

The recess 163 is formed on an upper surface of the first cover 103 and is configured to position the arm part 161*b* of the lock arm 161 therein as shown in FIG. 7. The lock arm receiving part 162 is formed in the recess 163.

Figure 8:
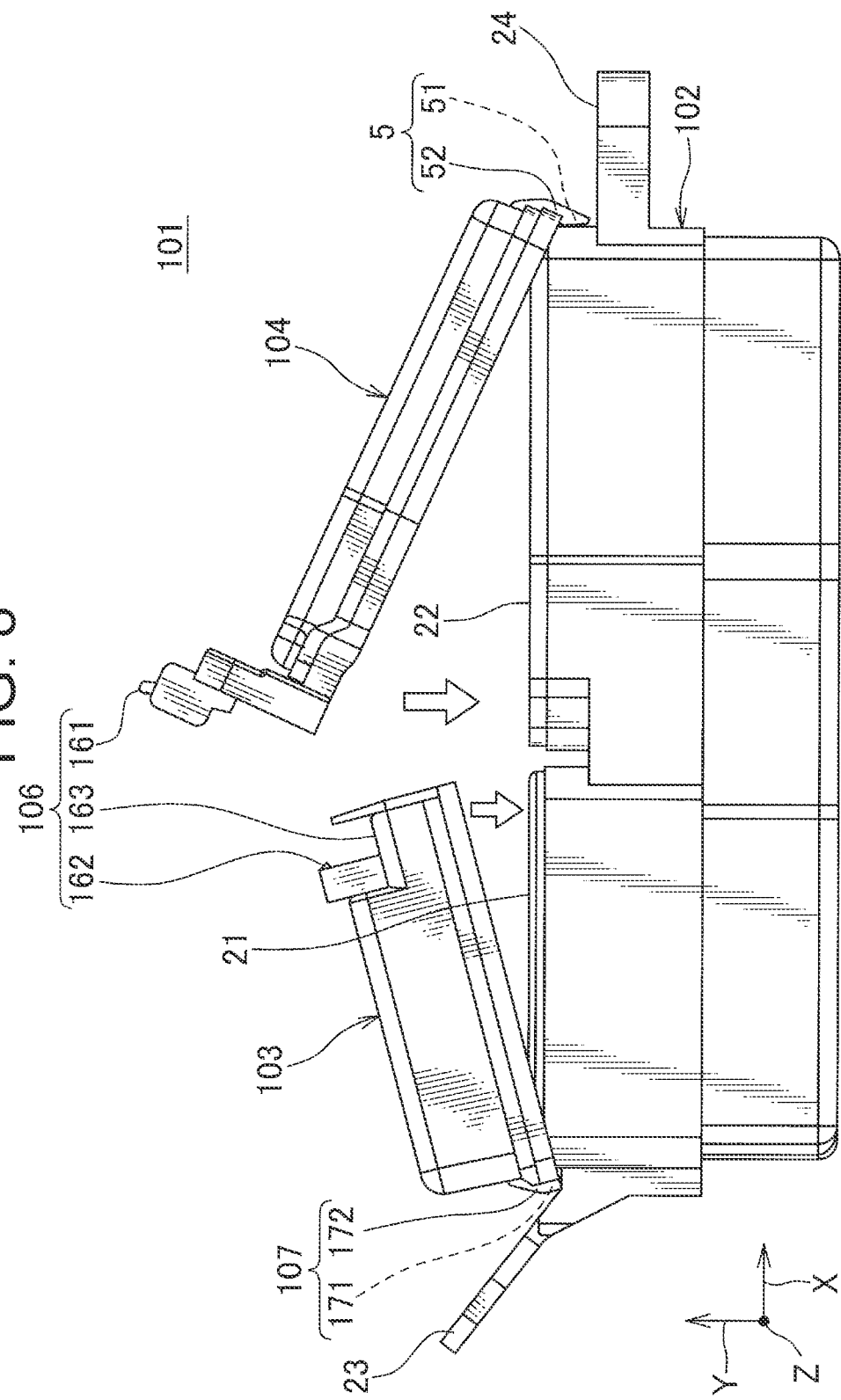
FIG. 8 illustrates a state in which a first opening in FIG. 5 is being covered with a first cover and a state in which a second opening is being covered with a second cover.
Figure 9:
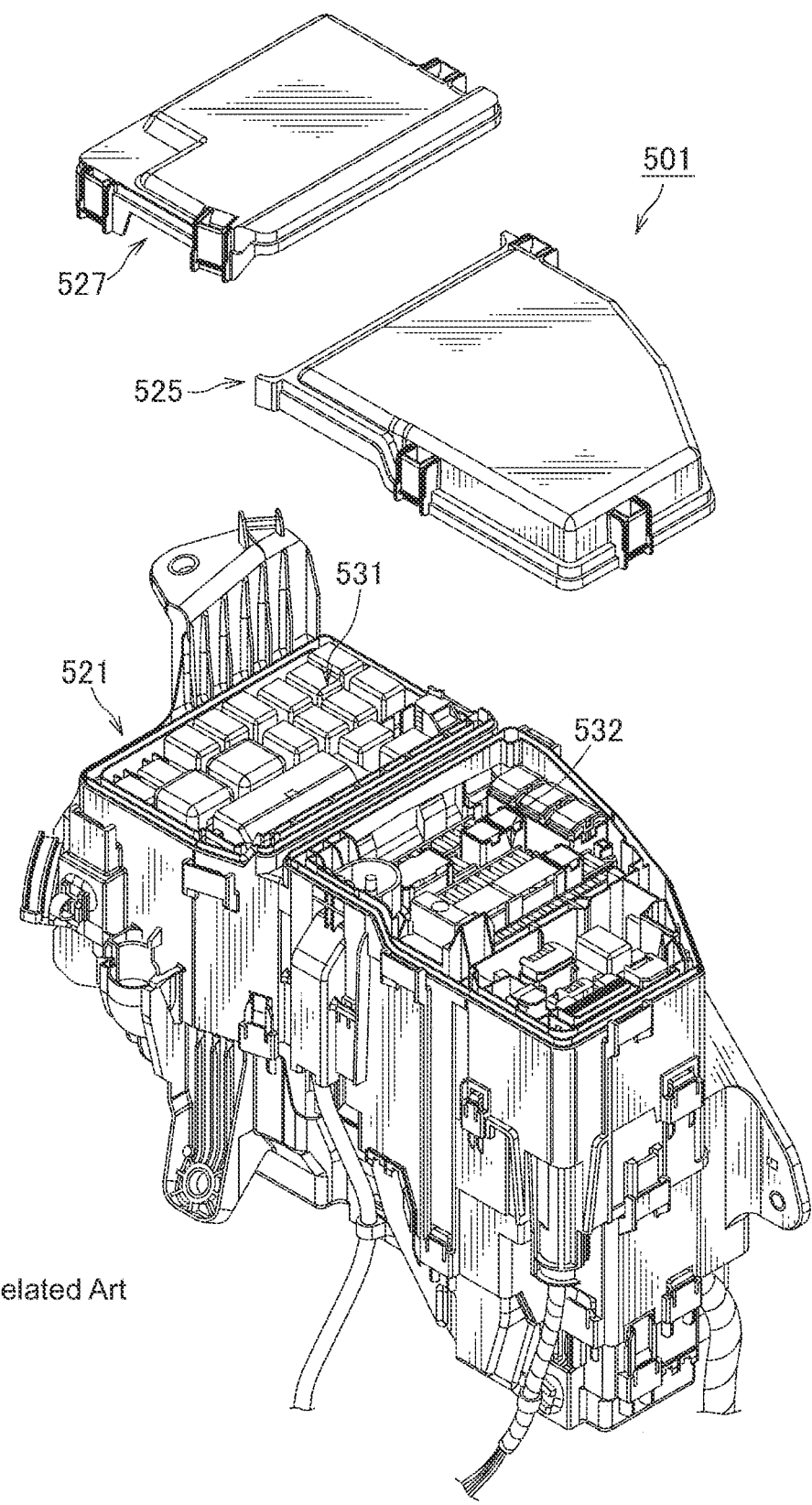
FIG. 9 is an exploded view of a conventional electrical junction box.

The first cover 103 and the second cover 104 are fixed to the case body 102 as follows. First, as shown in FIG. 8, the respective engaging frames 172 of the first cover 103 are engaged with the respective engaging protrusions 171, and then the first cover 103 is rotated in the arrow direction about these engaging frames 172 so as to cover the first opening 21 by the first cover 103. Next, the engaging frame 52 of the second cover 104 is engaged with the engaging protrusion 51, and the second cover 104 is rotated in the arrow direction about the engaging frame 52 so as to cover the second opening 22 by the second cover 104 and to make the lock arm 161 engaged with the lock arm receiving part 162. In this manner, the first cover 103 and the second cover 104 are fixed to the case body 102.

The first cover 103 and the second cover 104 are removed from the case body 102 as follows. First, the operation part 161*c* is pushed to elastically deform the arm part 161*b* in the disengaging direction to disengage the lock arm 161 from the lock arm receiving part 162. While keeping this state, a part of the second cover 104 on the lock arm 161 side is lifted to displace the engaging frame 52 from the engaging protrusion 51 to remove the second cover 104 from the case body 102. Next, a part of the first cover 103 on the lock arm receiving part 162 side is lifted to displace the respective engaging frames 172 from the respective engaging protrusions 171 to remove the first cover 103 from the case body 102.

Thus, in the electrical junction box 101, the first cover 103 is fixed to the case body 102 by only the rotation fulcrum engaging part 107 and the inter-cover engaging part 106, and the second cover 104 is fixed to the case body 102 by only the rotation fulcrum engaging part 5 and the inter-cover engaging part 106. With this configuration, the first cover 103 and the second cover 104 can be fixed to and removed from the case body 102 more easily than the first embodiment. Furthermore, with the configuration in which the lock arm 161 is positioned in the recess 163, a distance between the first cover 103 and the second cover 104 can be shortened, thereby downsizing the electrical junction box 101.

The above-described embodiments are only representative forms of the present invention, and the present invention is not limited to this embodiment. In other words, various modifications can be made without departing from the gist of the present invention. These modifications, as long as they have configuration of the present invention are of course within the present invention.

LIST OF REFERENCE SIGNS 1, 101 electrical junction box
2, 102 case body
3, 103 first cover
4, 104 second cover
5 rotation fulcrum engaging part
6, 106 inter-cover engaging part
51 engaging protrusion
52 engaging frame
61, 161 lock arm
62, 162 lock arm receiving part

What is claimed is:

1. An electrical junction box comprising:
a case body on which a first opening and a second opening are formed;
a first cover configured to be fixed to the case body such that the first cover covers the first opening; and
a second cover configured to be fixed to the case body such that the second cover covers the second opening, wherein
the second cover is fixed to the case body by a first rotation fulcrum engaging part and an inter-cover engaging part,
the first rotation fulcrum engaging part includes:
an engaging protrusion formed on one end of the case body, and
an engaging frame formed on one end of the second cover and configured to be engaged with the engaging protrusion,
the inter-cover engaging part includes:
a lock arm formed on another end of the second cover, and
a lock arm receiving part having a protrusion shape and formed on the first cover,
the lock arm includes an arm part which is elastically deformable, and a hole formed on the arm part and into which the lock arm receiving part is fitted, and
when the first cover and the second cover are fixed to the case body, the lock arm is pressed against the lock arm receiving part to be elastically deformed such that the lock arm is engaged with the lock arm receiving part in a state in which the lock arm receiving part is fitted into the hole.

2. The electrical junction box according to claim 1, wherein
the first cover is fixed to the case body by a second rotation fulcrum engaging part and the inter-cover engaging part, the second rotation fulcrum engaging part including:
an engaging protrusion formed on another end of the case body and
an engaging frame which is formed on an end of the first cover on a side opposite to the lock arm receiving part and which is configured to be engaged with the engaging protrusion of the second rotation fulcrum engaging part.

3. The electrical junction box according to claim 1, wherein
a recess is formed on the first cover, the recess being configured to position the lock arm formed on the second cover, and
the lock arm receiving part is formed in the recess.

* * * * *